Patented Feb. 12, 1935

1,990,658

UNITED STATES PATENT OFFICE 1,990,658

RECLAIMED RUBBER

Gilbert F. Lane, Akron, Ohio, assignor to The Philadelphia Rubber Works Company, Akron, Ohio, a corporation of Delaware No Drawing. Application October 12, 1933, Serial No. 693,318

7 Claims. (Cl. 18—52)

This invention relates to the manufacture of reclaimed rubber, and particularly of reclaimed rubber containing high proportions of fiber.

Many rubber articles contain as reinforcements textile fabrics or other fibrous structures. When such articles are worn out or have outlived their usefulness, the presence of the fiber complicates the problem of reclaiming the rubber for further use. The fiber associated with rubber goods is generally the highest grade of cotton fiber. Nevertheless, it has been found to be uneconomical to separate the fiber from the rubber, hence it is the universal practice to destroy the fiber either with acids or strong alkalies in order to reclaim the rubber.

In the process of this invention, on the other hand, the fiber is not destroyed, but is retained in the reclaimed rubber, with its strength practically unimpaired, and contributes largely to the desirable qualities of the product.

The process is carried out by shredding or otherwise subdividing vulcanized scrap rubber containing cotton fiber, such as old pneumatic tires or tire carcasses, belting, hose, boots and shoes, and the like, adding a very small proportion of caustic alkali, and heating. Preferably a suitable softener or plasticizer such as an oil, resin, bitumen or the like is also added before heating. The alkali, for some reason which is not well understood, protects the cotton fiber from deterioration during the drastic heating required for the devulcanization of the rubber. If the alkali is omitted, the strength of the fiber is completely destroyed by the heat, so that it readily crumbles and completely loses its identity as a fibrous material. On the other hand, if the quantity of alkali is much increased it will itself destroy the fiber. The quantity of alkali which is preferred is approximately 1% of the total weight of the scrap rubber, but the quantity may be reduced to a fraction of that amount if desired, so long as sufficient is used to maintain the scrap distinctly alkaline; or even somewhat larger proportions may be used.

The product of the process outlined above is a reclaimed rubber containing undegenerated fiber. It is plastic and may be milled on the ordinary rubber mills and mixed with pigments, fillers, etc. It may be vulcanized if desired, but because of its fiber content it is fairly stiff and not subject to cold flow or creeping, and is therefore well adapted for the manufacture of products in which the vulcanization step is omitted. Such products may be molded cold under high pressure and are immediately ready for use.

As a specific example of one embodiment of this invention, 100 parts by weight of pneumatic tire carcasses ground to pass ¼ inch mesh are mixed with 8 parts of a plasticizer such as petroleum pitch and 2 parts of a 46% solution or caustic soda. The mixture is placed in an autoclave and live steam at a pressure of 100 pounds per square inch is admitted and maintained for 8 hours. The steam is then blown off and the contents of the autoclave cooled and dried. It is not necessary to wash the product, as the small proportion of alkali used apparently reacts with the scrap or some constituent thereof and is completely absorbed by the product.

It is to be understood that the invention is not to be limited to the specific example set forth above, but that many modifications of the invention may be made within the scope of the appended claims.

I claim:

1. The process of reclaiming rubber which comprises heating fiber-containing vulcanized scrap with a small proportion of caustic alkali.

2. The process of reclaiming rubber which comprises heating fiber-containing vulcanized scrap with approximately 1% of caustic soda.

3. The process of reclaiming rubber which comprises heating fiber-containing vulcanized scrap with a plasticizer and approximately 1% of caustic soda.

4. The process of reclaiming rubber which comprises heating fiber-containing vulcanized scrap in live steam with a small proportion of caustic alkali.

5. The process of reclaiming rubber which comprises heating fiber-containing vulcanized scrap in live steam with a concentrated solution of approximately 1% of caustic soda.

6. The process of reclaiming rubber which comprises heating fiber-containing vulcanized scrap in live steam with a plasticizer and a concentrated solution of approximately 1% of caustic soda.

7. A reclaimed rubber derived from fiber-containing scrap and containing the fiber in an undegenerated condition together with a small proportion of combined alkali.

GILBERT F. LANE.